United States Patent [19]

Cambray et al.

[11] Patent Number: 5,278,898
[45] Date of Patent: Jan. 11, 1994

[54] SYSTEM FOR MANAGING A HOLD QUEUE

[75] Inventors: John E. Cambray, Pelham; B. Scott Smith, Londonderry, both of N.H.

[73] Assignee: Davox Corporation, Billerica, Mass.

[21] Appl. No.: 707,707

[22] Filed: May 30, 1991

[51] Int. Cl.⁵ .................. H04M 3/00; H04M 5/00
[52] U.S. Cl. .................. 379/266; 379/309; 379/265
[58] Field of Search .................. 379/266, 309, 265

[56] References Cited

U.S. PATENT DOCUMENTS

| 4,757,529 | 7/1988 | Glapa et al. | 379/244 |
| 4,858,120 | 8/1989 | Samuelson | 379/309 |
| 4,953,204 | 8/1990 | Cuschleg, Jr. et al. | 379/309 |
| 5,025,468 | 6/1991 | Sikand et al. | 379/266 |

Primary Examiner—James L. Dwyer
Assistant Examiner—Fan Tsang
Attorney, Agent, or Firm—Daniel J. Bourque

[57] ABSTRACT

A system for electronically managing calls in a hold queue wherein the hold queue is prioritized into a number of priority categories according to user selectable priority criteria. As an operator becomes available, the system selectively assigns the calls on hold to an available operator in a sequential manner according to the priority category of the calls and the type of hold queue utilized.

16 Claims, 2 Drawing Sheets

SYSTEM FOR MANAGING A HOLD QUEUE

FIELD OF THE INVENTION

This invention relates to automated telephone systems and more particularly, to a system and method for managing telephone calls which have been placed on hold and which enter a hold queue.

BACKGROUND OF THE INVENTION

Automated telephone systems are now in widespread use among users such as providers of telemarketing, credit collecting and reservation services.

Users of such systems desire to optimize system performance by attempting to ensure nearly 100% operator productivity while minimizing the number of calls which are placed on hold. This concern arises from the fact that customers who are placed on hold will at some point hang up and be lost.

Several prior art methods have been developed to prioritize the order in which calls placed on hold are answered, but all have been met with limited success. These methods include prioritizing the on-hold calls based upon the telephone number dialed. For example, long distance callers who are on hold would be handled before local callers who have been placed on hold. Another method involves prioritizing the on-hold calls strictly by age or the length of time the call has been placed on hold. This method fails to recognize the non-uniformity in the willingness of customers to remain on hold based upon the length of time the caller has been on hold. For example, a customer who has been on hold for 30 or 40 seconds may not be more apt to hang up then a customer who has been on hold for 10 seconds or less. Another example is that customers are more apt to hang up when a message is played during the hold interval. Additionally, such non-uniformity in hold tolerance will vary and change from user to user, and from campaign to campaign at any given user.

SUMMARY OF THE INVENTION

This invention features a system including a method for managing calls on hold connected to an automated telephone system by allowing the system to prioritize the calls on hold according to selectable, dynamically controllable priority criteria. The connected calls are placed on hold and a call record corresponding to each of the calls placed on hold is inserted into a hold queue. Each of the call records includes at least a first portion identifying the connected call, and a second, call prioritizing portion, which includes predetermined indicia from which call prioritizing may be accomplished. A hold queue prioritizer prioritizes the call records in the hold queue utilizing the predetermined indicia, and establishes a number of call priority categories.

After the system determines the availability of an operator to answer a call, the system determines if one or more calls in the hold queue are in a first priority category. In one embodiment, the first priority category includes the highest level priority category. Subsequently, the system selectively assigns all of the calls on hold in the first priority category to available operators in a sequential manner.

After all of the calls in the first priority category have been assigned to an operator, the system next determines if any calls in the hold queue are in a second or subsequent priority category, following which the system selectively assigns the calls in the second and subsequent priority categories to an available operator in a sequential manner according to the priority category of the call. In one embodiment, the second and subsequent priority categories include a middle and low priority categories. The selected priority criteria may include the length of time during which each of the connected calls has been in the hold queue or the occurrence of an event such as the playing of a hold message.

In one embodiment, all of the calls from a given priority category are sequentially assigned to an available operator according to the type of hold queue. For example, when the hold queue includes a First In First Out (FIFO) hold queue, the calls on hold are sequentially assigned beginning with the call which has been on hold the longest period of time from within a given priority category. When the hold queue includes a Last In First Out (LIFO) hold queue, the calls from within a given priority category are sequentially assigned beginning with the call which has been on hold the shortest period of time. The system continues selectively and sequentially assigning calls to an available operator according to the decreasing priority categories of the calls in the hold queue and according to the type of hold queue, until the hold queue is finally empty.

DESCRIPTION OF THE DRAWINGS

These, and other features and advantages of the present invention will be better understood by reading the following detailed description, taken together with the drawings, wherein.

DETAILED DESCRIPTION OF THE INVENTION

Figure 1:
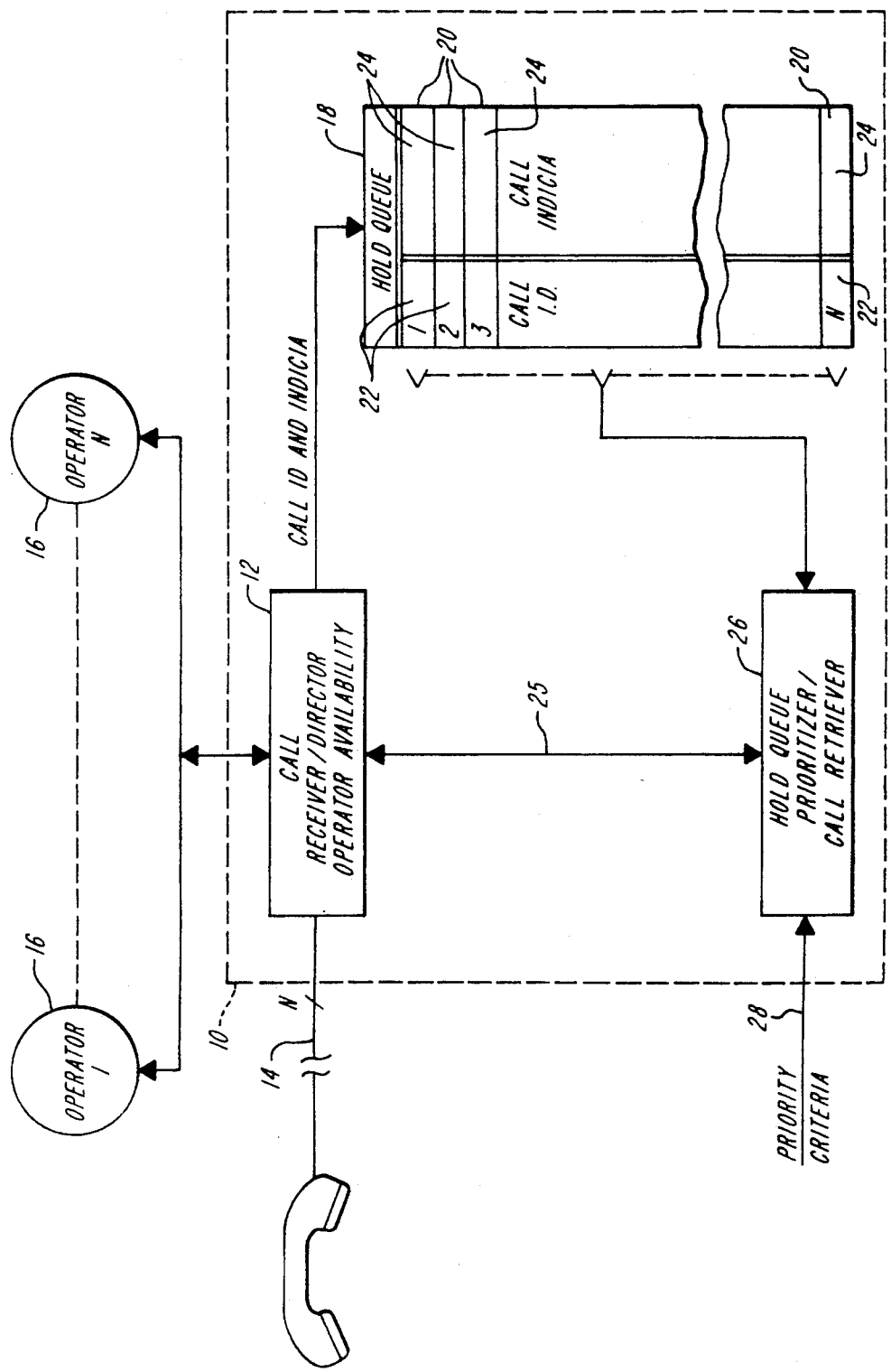
FIG. 1 is a block diagram of the system for managing a hold queue according to the present invention.

The system for managing calls on hold according to the present invention is shown within dash line 10, FIG. 1, and includes a call receiver/director 12 which is coupled to one or more telephone lines 14. Call receiver/director 12 is typically a PBX telephone switching system which can connect to and switch a number of telephone lines. In the preferred embodiment, the PBX or similar telephone line switch forms part of an automated telephone calling/answering system which is well known to those skilled in the art. Such a system includes the CAS 2000 system and the CVRS 2000 system, available from DAVOX, Billerica, Mass.

Call receiver/director 12 is also coupled to one or more operator terminals 16 which are capable of connecting to at least a telephone line. In the preferred embodiment, the operator terminals are also capable of simultaneously connecting with a computer system (not shown) containing one or more customer database files. Such an operator terminal is described in greater detail in applicant's co-pending application Ser. No. 07/532,453, entitled: Voice Response System With Automated Data Transfer which is incorporated herein by reference. Call receiver/director 12 also monitors and keeps track of the availability of one or more operators at operator terminals 16.

Upon receiving one or more calls over one or more telephone lines 14, call receiver/director 12 routes the call to an available operator 16. In one embodiment, call receiver/director 12 will immediately route an incoming connected call to an available operator if an available operator exists. In another embodiment, all calls received over telephone lines 14 by the call receiver/director 12 are inserted into the hold queue 18.

Hold queue 18 typically includes a plurality of storage locations such as registers or memory locations in which may be inserted or stored a plurality of call records 20. In one embodiment, each call record 20 includes a first portion 22 which identifies the connected call by a number, telephone line, or other similar identification indicia. Each of the call records also includes a second portion 24 which contains predetermined indicia from which call prioritizing may be accomplished. In the preferred embodiment, the indicia includes an indication of the "age" of the call, that is, the amount of time that the call has been "on hold", although other types of indicia are contemplated by the present invention.

Hold queue prioritizer and call retriever 26 receives predetermined priority criteria 28 from a source such as a personal computer, supervisory operator workstation, or the automated telephone system. The priority criteria 28 determines what standards hold queue prioritizer/retriever 26 will utilize after scanning the contents of hold queue 18 to form a plurality of priority categories. The priority categories, each typically including a number of on hold call records, determine in which order hold queue prioritizer/call retriever 26 will retrieve the call records and provide the record to call receiver/director 12 over path 25 for routing to an available operator.

In the preferred embodiment, the hold queue prioritizer/call retriever 26 utilizes the predetermined priority criteria 28 to form a plurality of priority categories such as a high, medium, and low priority categories. After forming the priority categories, hold queue prioritizer/call receiver 26 selectively retrieves the call records from the hold queue according to the selected priority category. For example, calls in a high priority category will be retrieved followed by calls in a middle priority category, and subsequently followed by call records in a low priority category.

Hold queue prioritizer/call receiver 26 retrieves call records from within a given priority category according to the type of hold queue employed. For example, if the hold queue is a First In First Out (FIFO) type of hold queue, and the priority criteria is age or the length of time that the call has been in the hold queue, then hold queue prioritizer/call retriever 26 will begin retrieving the oldest call which has been on hold in the category with the highest priority. Following retrieval of the oldest call in the highest priority category, hold queue prioritizer/call retriever 26 will retrieve the second oldest call on hold, followed by the third oldest call on hold, and so on.

If, on the other hand, the hold queue is a Last In First Out (LIFO) hold queue, then the hold queue prioritizer/call retriever will retrieve the newest call from the given hold queue category. Thus, by properly choosing the type of hold queue utilized, as well as the priority criteria utilized, the system may be tailored to retrieve the calls on hold under complete control from the system user or manager. Thus, if a particular user recognizes a particular non-uniformity in hold times maintained by its customers, the system of the present invention may be tailored to group the calls on hold according to the non-uniformity detected, and thus minimize the amount of customers which are lost.

In addition, the system of the present invention may employ dynamic or real time priority criteria development in response to dynamically measured criteria. For example, the system of the present invention can monitor the length of time a customer remains on hold in the hold queue before hanging up and utilize that information to dynamically alter or generate new priority criteria 28 which in turn causes hold queue prioritizer 26 to reformat the priority categories and retrieve calls before the customers have a chance to hang up.

Additional priority criteria may be based on an event such as a hold message being played or the playing of a predetermined portion of a hold message after which, for example, previous experience teaches that customers are more apt to hang up. Further, call priority may be determined from a response received from the customer's touch tone telephone over path 25.

Figure 2:
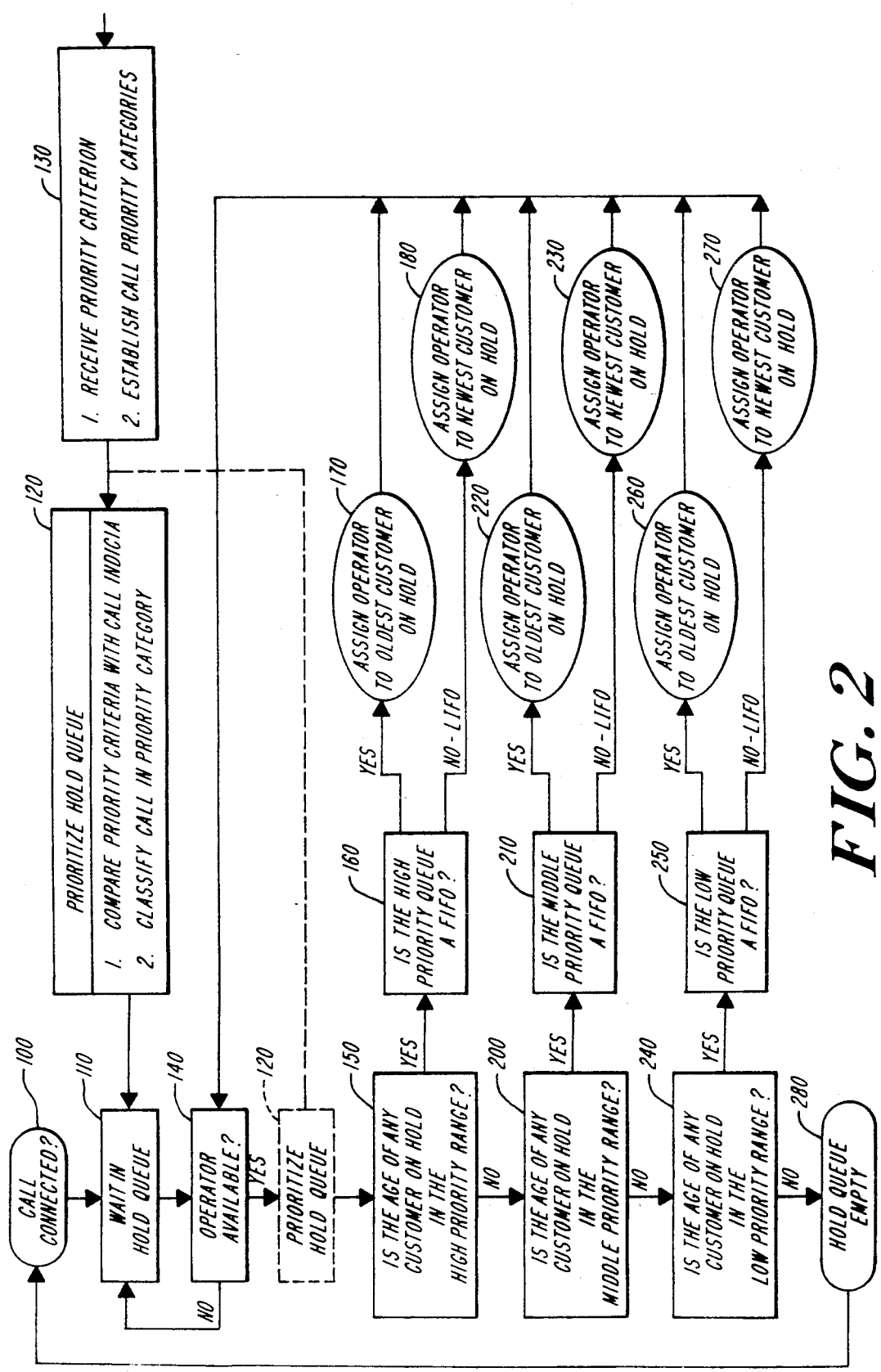
FIG. 2 is a flow chart showing the operation of the system for managing a hold queue according to the present invention.

The operation of the system for managing a hold queue according to the present invention is illustrated in the flow chart of FIG. 2 wherein at step 100, the system reacts to a connected call by, in the present embodiment, inserting the call into the hold queue, step 110. The calls on hold in the hold queue are prioritized, step 120, in response to received priority criteria, step 130. As previously explained, steps 120 and 130 can be continuously performed to provide dynamic call prioritizing.

After a connected call is inserted into the hold queue, the system next determines whether or not an operator is available, step 140. An operator may signal availability to the system by simply going on hook, or by a keyboard command to a host computer which informs the system, or by a special agent instrument keyboard which is directly connected to the system. If an operator is not available, the system loops back to step 110 wherein the call(s) remain in the hold queue while simultaneously being prioritized and possibly re-prioritized according to the selected or modified priority criteria.

Once an operator becomes available, processing continues to step 150 wherein, utilizing priority criteria of "age" of the call for exemplary purposes, the system determines whether the age of any customer on hold is in a high priority category. If such a call is located in the hold queue, the system next proceeds to step 160 wherein a determination is made as to whether or not the hold queue is a FIFO hold queue. If the hold queue is a FIFO hold queue, the available operator is assigned to the customer (call) which has been on hold the longest period of time, step 170. If, on the other hand the hold queue is determined not to be a FIFO, step 160, the hold queue is determined to be a LIFO and the available operator is assigned to the customer (call) who has been on hold the shortest amount of time, step 180. In both cases, processing returns to step 140 wherein the system awaits an available operator.

After all of the calls on hold in the high priority category have been assigned to an operator, the system proceeds to step 200 wherein a determination is made as to whether or not the "age" of any customers on hold is determined to be in the middle priority category. If at least one of the calls on hold is in the middle priority category, the system proceeds to step 210 to determine whether the hold queue is a FIFO hold queue in which case the available operator is assigned to the oldest customer on hold, step 220. If the hold queue is a LIFO hold queue, the available operator is assigned to the newest customer on hold, step 230, following which in both cases, processing returns to step 140 to await an available operator.

In one embodiment, the users of an automated telephone system and more particularly, the system for managing a hold queue may determine that there is a non-uniformity between the length of time a customer will remain on hold and the amount of time that same customer has actually been on hold. A typical implementation of this system is to assign high priority to those calls past the limit the provider wishes to set (maximum hold time), middle priority to those calls in the hold process which the provider has noticed result in extra hang-ups, and low priority to all remaining calls.

For example, in an Airline Reservation System, providers do not want customers to be on hold longer than ten minutes. Therefore, those customers (calls) which have been on hold past this point are assigned to the highest priority category.

In this same example, it has also been found that customers who have been on hold an intermediate amount of time, from 1 to 2 minutes, tend to be the next most likely to hang up and accordingly, calls which have been on hold from one to two minutes are considered to be special cases and are handled as the middle or second category of priority.

On the other hand, all other calls, such as those who have been on hold from 0 to 1 minute and from 2 to 10 minutes, have repeatedly shown to be the least likely to hang up and accordingly, are handled last or afforded the lowest category of priority.

The capability of alerting call prioritizing is also shown by the need to alter call priority categories based upon whether the call is an incoming call, in which case the caller might stay on the line a longer period of time, or an outbound call in which case a customer is more likely to hang up sooner.

Accordingly, once all of the high and middle priority category calls have been handled, the system proceeds to step 240 wherein any calls on hold in the low priority category (typically all remaining calls) are identified. At step 250, the system again determines whether the hold queue is a FIFO hold queue in which case the call on hold the longest within the low priority category is assigned to an available operator, step 260. If the hold queue is a LIFO hold queue, the call on hold the shortest amount of time is assigned to an available operator, step 270. Subsequently, the system returns to step 140 to await an available operator. When and if the hold queue is empty, step 280, the system returns to step 100 to await a connected call inserted into the hold queue.

Modifications and substitutions by one of ordinary skill in the art are considered to be within the scope of the present invention, which is not to be limited except by the claims which follow.

I claim:

1. A method for managing calls connected to an automated telephone system, comprising the steps of:
    inserting a call record of each connected call into a hold queue of a predetermined type, said call record including a call identifying portion and a call prioritizing portion;
    prioritizing each call record in said hold queue into one of a plurality of predetermined call priority categories according to at least a first selectable priority criterion by comparing said call prioritizing portion of each call record with said at least a first selectable priority criterion, each of said plurality of predetermined call priority categories having a call assigning priority level which differs from the others of said plurality of predetermined call priority categories, and wherein said call assigning priority level of at least a first one of said plurality of predetermined call priority categories is higher than said call assigning priority level of at least a second one of said plurality of predetermined call priority categories;
    determining the availability of an operator to which a connected call may be assigned;
    upon the availability of an operator, performing the steps of:
    (a) prioritizing each of said call records presently in said hold queue and changing, if required, the call priority category of each of said previously prioritized call records presently in said hold queue, and
    (b) retrieving a call record stored in said hold queue according to the call assigning priority level of each of said prioritized call records presently in said hold queue, such that a call record which is prioritized in a call priority category having a higher call assigning priority level is retrieved before a call record prioritized in a call priority category having a lower call assigning priority level, and
    (c) assigning a connected call represented by said retrieved call record to said available operator, thus assuring that a connected call having a higher call assigning priority level is assigned to an available operator before a connected call with a lower call assigning priority level; and
    after assigning said connected call represented by said retrieved call record, and provided there is at least one call record of a connected call in said hold queue, returning to the step of determining the availability of an operator.

2. The method of claim 1 wherein said plurality of predetermined priority categories include a high, medium and low priority category.

3. The method of claim 1 wherein the step of prioritizing said hold queue upon the availability of an operator further includes prioritizing according to said at least a first, selectable priority criterion.

4. The method of claim 1 wherein the step of prioritizing said hold queue upon the availability of an operator further includes prioritizing according to a second, selectable priority criterion.

5. The method of claim 1 wherein said at least a first selectable priority criterion includes a range of length of time during which each of said call records of said connected calls has been in said hold queue.

6. The method of claim 1 wherein said at least a first selectable priority criterion includes a detected predetermined event.

7. The method of claim 1 wherein said detected predetermined event includes the state of a hold message being played.

8. The method of claim 1 wherein said detected predetermined event includes a response from a customer on a connected call.

9. The method of claim 1 wherein the steps of assigning each and every call in said hold queue in each of said plurality of predetermined priority categories includes sequentially assigning each of said connected calls in each of said plurality of predetermined priority categories in a predetermined order according to said predetermined type of hold queue.

10. The method of claim 9 wherein said predetermined type of hold queue includes a First In First Out hold queue; and wherein said steps of sequentially assigning calls in said predetermined order include sequentially assigning each of said connected calls in each of said plurality of predetermined priority categories beginning with the connected call which has been in said hold queue the longest period of time within each predetermined priority category.

11. The method of claim 8 wherein said predetermined type of hold queue includes a Last In First Out hold queue; and wherein said steps of sequentially assigning calls in said predetermined order include sequentially assigning each of said connected calls in each of said plurality of predetermined priority categories in said hold queue beginning with the connected call which has been in said hold queue the shortest period of time within each predetermined priority category.

12. The method of claim 1 wherein the step of determining the availability of an operator includes monitoring an operator terminal for a predetermined signal.

13. A system for managing calls on hold and connected to an automated telephone system comprising:

means for receiving a plurality of calls connected to said automated telephone system, and for providing a corresponding plurality of call records;

each of said call records including a first portion identifying the connected call, and a second call prioritizing portion including call prioritizing indicia from which call prioritizing may be accomplished;

a plurality of operator terminals, coupled to said means for receiving, for handling a corresponding plurality of connected calls;

one hold queue, coupled to said means for receiving, and including a plurality of memory locations in which a corresponding plurality of said call records may be inserted;

a hold queue prioritizer including:

means, responsive to at least a first selectable call priority criterion and to said call prioritizing indicia, for establishing a plurality of call priority categories by comparing said call prioritizing indicia of each call record with said at least a first selectable call priority criterion;

means, responsive to said means for establishing a plurality of call priority categories, for prioritizing each of said call records in said one hold queue into one of said plurality of established call priority categories; and means, responsive to said prioritized call records, for sequentially retrieving call records stored in said one hold queue according to the plurality of established call priority categories; means for detecting an available operator, and responsive to the detection of said available operator, for directing said hold queue prioritizer to:

(a) prioritize each of said call records presently in said one hold queue and to change, if required, the call priority category of each of said previously prioritized call records presently in said one hold queue, and (a) retrieve a call record stored in said one hold queue according to the call priority of each of said prioritized call records presently in said hold queue; and said means for detecting an available operator responsive to said retrieved call record, for assigning a connected call represented by said retrieved call record to said available operator according to said call priority categories, such that a connected call which is prioritized in a higher call priority category is assigned to said available operator before a connected call in a lower call priority category.

14. The system of claim 13 wherein said means for detecting an available operator directs said hold queue prioritizer to prioritize each of said call records presently in said one hold queue according to said at least a first selectable call priority criterion.

15. The system of claim 13 wherein said means for detecting an available operator directs said hold queue prioritizer to prioritize each of said call records presently in said one hold queue according to a second selectable call priority criterion.

16. The system of claim 15 wherein said means for detecting an available operator directs said hold queue prioritizer to prioritize each of said call records presently in said one hold queue according to at least one of said first and second selectable call priority criterion, and wherein at least one of said first and second selectable call priority criterion is determined dynamically by said hold queue prioritizer.

* * * * *